United States Patent
Wang et al.

(10) Patent No.: US 11,294,050 B2
(45) Date of Patent: Apr. 5, 2022

(54) AUTOMATIC GROUND INITIALIZATION OF RADAR ALIGNMENT SERVO

(71) Applicant: Rockwell Collins, Inc., Cedar Rapids, IA (US)

(72) Inventors: Xingming Wang, Marion, IA (US); Anthony Schoepske, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 268 days.

(21) Appl. No.: 16/743,994

(22) Filed: Jan. 15, 2020

(65) Prior Publication Data
US 2021/0215823 A1 Jul. 15, 2021

(51) Int. Cl.
G01S 13/95 (2006.01)
G01S 13/90 (2006.01)
G01S 7/40 (2006.01)

(52) U.S. Cl.
CPC .............. *G01S 13/953* (2013.01); *G01S 7/40* (2013.01); *G01S 13/9021* (2019.05)

(58) Field of Classification Search
CPC ..... G01C 21/005; G01S 13/86; G01S 13/933; G01S 13/935; G01S 19/46; G01S 19/485; G01S 2013/9322; G01S 7/4026; G01S 13/9021; G01S 13/9092; G01S 13/953; G01S 7/40; G01S 7/403; G01S 7/4034; G01S 7/4086; G01S 7/4091; G01S 7/52004; G08G 5/045
See application file for complete search history.

(56) References Cited

U.S. PATENT DOCUMENTS

| 4,283,725 | A | 8/1981 | Chisholm |
| 5,467,092 | A | 11/1995 | Roos et al. |
| 6,008,754 | A | 12/1999 | Roos |
| 7,138,940 | B2 | 11/2006 | Hager et al. |
| 7,183,969 | B2 | 2/2007 | Pozgay et al. |

(Continued)

FOREIGN PATENT DOCUMENTS

| EP | 2246933 A1 | 11/2010 |
| EP | 3502740 A1 | 6/2019 |

(Continued)

OTHER PUBLICATIONS

Extended Search Report for European Application No. 21151909.5 dated Jun. 17, 2021, 10 pages.

*Primary Examiner* — Timothy X Pham
(74) *Attorney, Agent, or Firm* — Suiter Swantz pc llo

(57) ABSTRACT

A system and method for ground calibration of an aircraft weather radar (W×R) employs a calibrated W×R already flight tested on a reference aircraft to generate a ground reference map from a specific ground position on a specific heading. A W×R alignment tool receives the ground reference map and compares it to an uncalibrated ground map generated by an uncalibrated W×R in the same ground position and on the same heading. Once compared, the alignment tool determines a delta between the ground reference map and the uncalibrated ground map and determines offset values in pitch, roll, and elevation to reduce the delta to a desired operational value and make the maps nearly identical. The alignment tool then applies to offset values to the uncalibrated W×R to calibrate the W×R for operational use.

15 Claims, 4 Drawing Sheets

(56) References Cited

U.S. PATENT DOCUMENTS

| | | | |
|---|---|---|---|
| 7,522,096 B2 | 4/2009 | Backes et al. | |
| 10,054,623 B2 | 8/2018 | Estebe et al. | |
| 2017/0023365 A1* | 1/2017 | Hunter, Jr. | G01C 21/165 |
| 2018/0075669 A1* | 3/2018 | Yeh | G01S 19/42 |
| 2020/0349723 A1* | 11/2020 | Geva | G06K 9/00791 |
| 2021/0109205 A1* | 4/2021 | Liao | G01S 17/86 |

FOREIGN PATENT DOCUMENTS

| | | |
|---|---|---|
| WO | 9429742 A1 | 12/1994 |
| WO | 2016025683 A1 | 2/2016 |

* cited by examiner

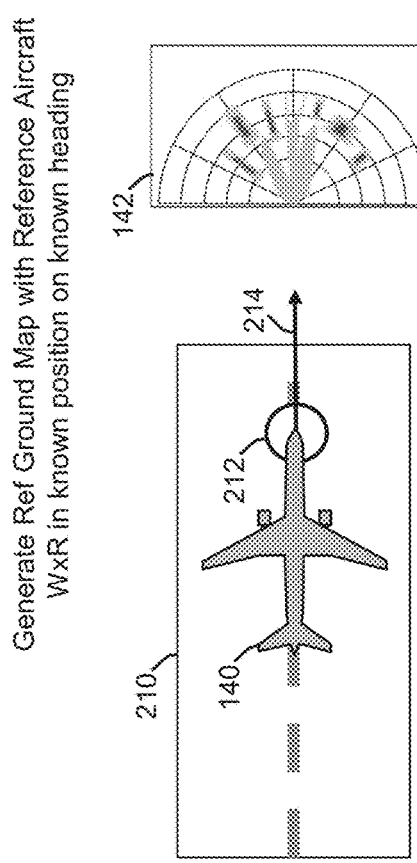
FIG. 2A
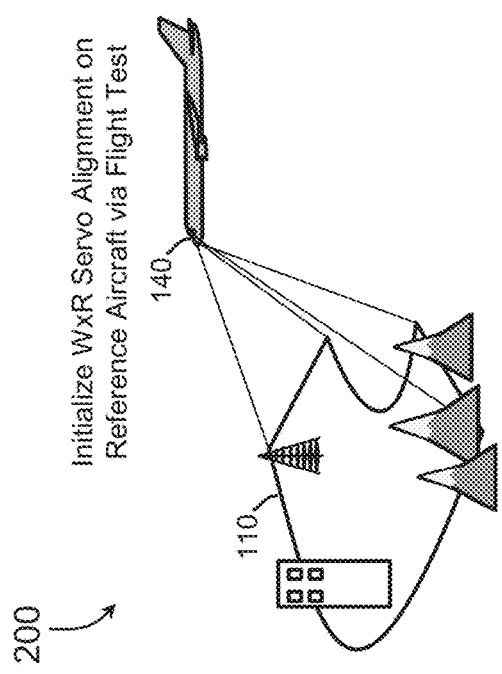
FIG. 2B
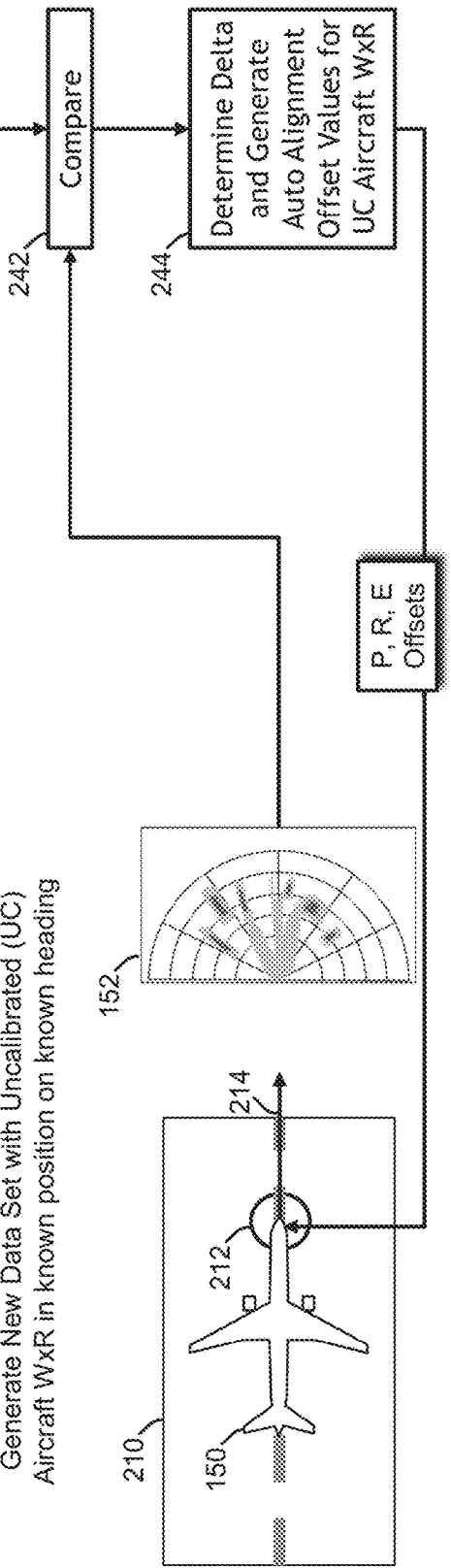
FIG. 2C
FIG. 2D

AUTOMATIC GROUND INITIALIZATION OF RADAR ALIGNMENT SERVO

BACKGROUND

An initialization of a weather radar system alignment servo for new aircraft may be a time-consuming and costly process requiring hours of flight test. Aircraft manufacturers may desire an easier and lower-cost approach to install and calibrate weather radar systems.

After installation of a new or replacement weather radar (W×R) offset values in pitch, roll, and elevation may be set at zero. An operator must initialize or reinitialize the alignment servo offset values for accurate operational representation of weather within the field of view of the W×R antenna. Without a calibrated servo, the W×R may present an inaccurate picture of actual weather conditions and falsely display undesirable ground returns.

Traditionally, a weather radar alignment servo initialization process may include a two to three-hour test flight with the aircraft in cruise flight, at least 17,000 ft above prevailing terrain in a field of view (FOV) of the weather radar. There must be terrain available in a left, a center, and a right display area of the weather radar flight deck display with no large bodies of water within the terrain area.

The weather radar system must be operated in an auto tilt mode during a minimum of two minutes in unaccelerated level flight to start the alignment process. During the initialization, the servo monitors the ground terrain in the FOV and over time, the W×R is calibrated. There can be no significant weather, mountainous terrain or large variations in terrain between 80 and 140 NM or the two-minute requirement may be extended.

Some calibration tools may be dependent on spatially placed external reflector devices or actual external transmitters to enable a calibration. However, often these reflector devices may be unavailable or poorly maintained.

Therefore, a need remains for a system and related method which may overcome these limitations and provide a novel solution to initializing a newly installed weather radar system without requiring a test flight.

SUMMARY

In one aspect, embodiments of the inventive concepts disclosed herein are directed to a system for ground calibration of an aircraft weather radar. The system may comprise an uncalibrated (UC) aircraft weather radar (W×R) onboard an UC aircraft, the UC W×R including a W×R controller and a W×R memory, the W×R controller operatively coupled to a communications port.

The system may also include a W×R alignment tool including an alignment tool controller, the W×R alignment tool including a tangible, non-transitory memory configured to communicate with the alignment tool controller, the tangible, non-transitory memory having instructions stored therein that, in response to execution by the alignment tool controller, cause the alignment tool controller to carry out a plurality of functions in accordance with the system for ground calibration of an aircraft weather radar.

The alignment tool controller may receive a reference ground map, the reference ground map 1) generated by a test flown calibrated W×R 2) onboard a reference aircraft 3) with the reference aircraft in a specific ground position, and 4) on a specific heading and receive an UC ground map produced by the UC W×R via the communications port 1) during an active UC W×R operation, with the UC aircraft 2) in the specific ground position, and 3) on the specific heading.

The alignment tool controller may compare the UC ground map to the reference ground map and determine a delta between the UC ground map and the reference ground map. [0009] The alignment tool controller may generate a pitch offset, a roll offset, and an elevation offset required to reduce the delta to a desired operational value and calibrate the UC W×R by applying the pitch offset, the roll offset and the elevation offset to the W×R memory via the communications port.

A further embodiment of the inventive concepts disclosed herein may include a method for ground calibration of an aircraft weather radar. The method may include receiving a reference ground map, the reference ground map 1) generated by a reference aircraft weather radar (W×R) 2) onboard a reference aircraft 3) with the reference aircraft in a specific ground position, and 4) on a specific heading.

The method may include receiving an uncalibrated (UC) ground map produced by an UC W×R onboard an UC aircraft 1) during an active UC W×R operation, with the UC aircraft 2) in the specific ground position, and 3) on the specific heading. The method may then include comparing the UC ground map to the reference ground map and determining a delta between the UC ground map and the reference ground map.

To calibrate the UC W×R, the method may include generating a pitch offset, a roll offset, and an elevation offset required to reduce the delta to a desired operational value and calibrating the UC W×R by applying the pitch offset, the roll offset and the elevation offset to a W×R memory.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIGS. 2A-D are diagrams of a system function in accordance with an embodiment of the inventive concepts disclosed herein;

DETAILED DESCRIPTION OF EXEMPLARY EMBODIMENTS

Figure 1:
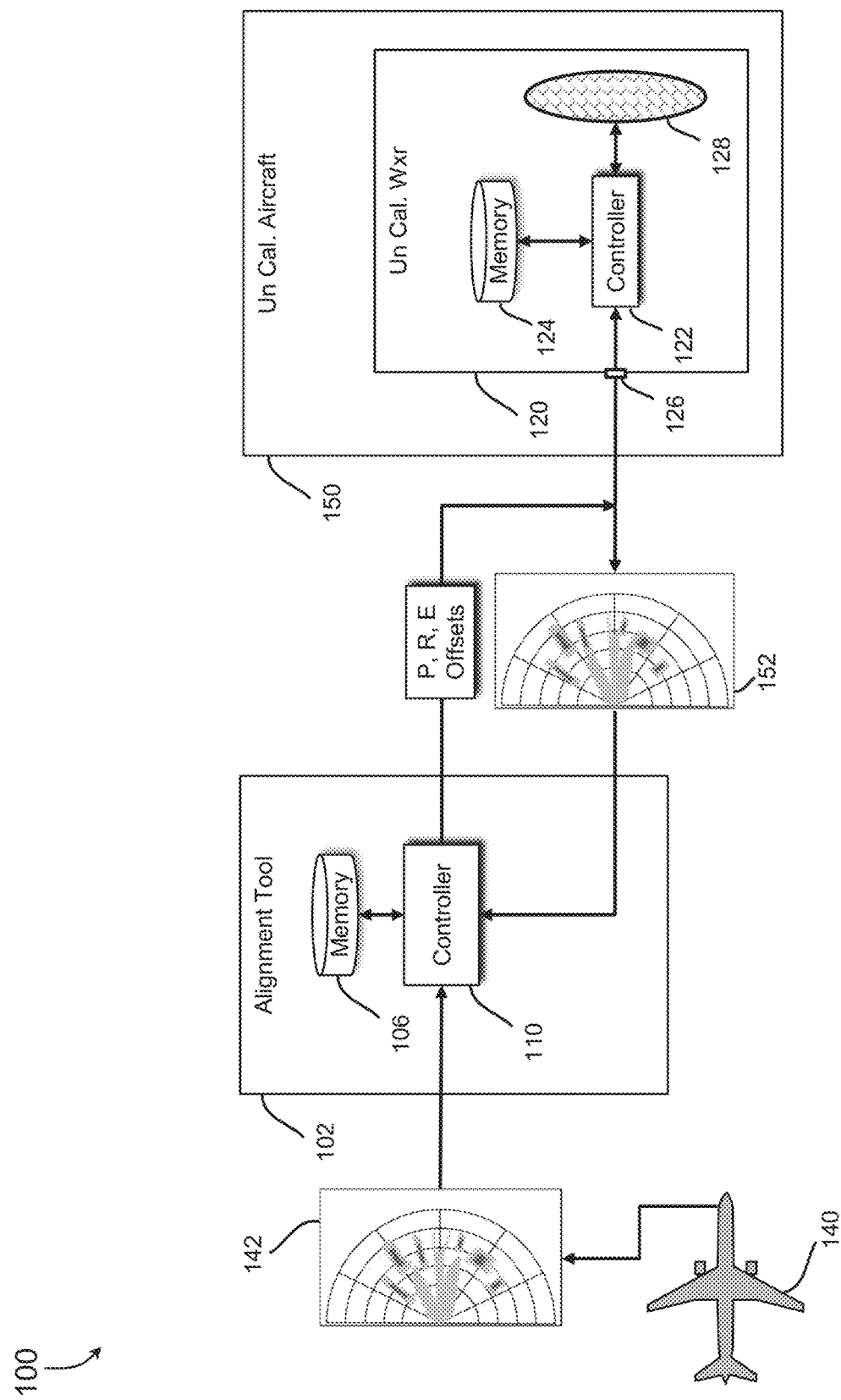
FIG. 1 is a diagram of a system for ground calibration of an aircraft weather radar in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for ground calibration of an aircraft weather radar (WxR) employs a calibrated WxR already flight tested on a reference aircraft to generate a ground reference map from a specific ground position on a specific heading. A WxR alignment tool receives the ground reference map and compares it to an uncalibrated ground map generated by an uncalibrated WxR in the same ground position and on the same heading. Once compared, the alignment tool determines a delta between the ground reference map and the uncalibrated ground map and determines offset values in pitch, roll, and elevation to reduce the delta to a desired operational value and make the maps nearly identical. The alignment tool then applies to offset values to the uncalibrated WxR to calibrate the WxR for operational use.

| REFERENCE CHART | |
|---|---|
| 100 | System for Ground Calibration of an Aircraft Weather Radar (WxR) |
| 102 | WxR Alignment Tool |
| 106 | Memory |
| 110 | Alignment Tool Controller |
| 120 | Uncalibrated WxR |
| 122 | WxR Controller |
| 124 | WxR Memory |
| 126 | Communications Port |
| 128 | WxR Antenna |
| 140 | Reference Aircraft |
| 142 | Reference Ground Map |
| 150 | Uncalibrated Aircraft |
| 152 | UC Ground Map |
| 200 | System Function |
| 210 | Surface Runway |
| 212 | Specific Ground Position |
| 214 | Specific Heading |
| 242 | Compare |
| 244 | Determine Offset Values |
| 300 | Perspective View |
| 302 | Left Sector Tower |
| 304 | Left Sector Buildings |
| 306 | Center Sector Terrain |
| 308 | Right Sector Terrain |
| 310 | Right Sector Mountain |
| 312 | Right Sector Buildings |
| 400 | Method Flow |

FIG. 1 System

Referring now to FIG. 1, a diagram of a system for ground calibration of an aircraft weather radar in accordance with an embodiment of the inventive concepts disclosed herein is shown. Generally, a system for ground calibration of an aircraft weather radar (WxR) 100 may include an WxR alignment tool 102 configured to calibrate an calibrate an uncalibrated (UC) aircraft weather radar (WxR) 120 onboard an UC aircraft 150.

In embodiments, the UC WxR 120 may further comprise a new WxR in a new UC aircraft 150, a suspect WxR in a reference aircraft, a WxR on which a maintenance function has been performed, and an UC WxR in an UC aircraft 150 of a plurality of aircraft types.

In one embodiment of the inventive concepts disclosed herein, the UC WxR 120 may include a WxR controller 122 and a WxR memory 124. Here, the WxR controller 122 may be operatively coupled to a communications port 126. In embodiments, the communications port may include an ethernet port or an additional type of wired port.

In one embodiment of the inventive concepts disclosed herein, the WxR alignment tool 102 may include an alignment tool controller 110 coupled with a tangible, non-transitory memory 106 configured to communicate with the alignment tool controller 110, the tangible, non-transitory memory 106 having instructions stored therein that, in response to execution by the alignment tool controller 110, cause the alignment tool controller 110 to carry out the function of the system for ground calibration of the WxR 100.

In embodiments, the WxR alignment tool 102 may be incorporated within a portable WxR health monitor tool or an additional type of stand-alone portable device configured for communication with each of the calibrated W×R and the UC W×R 120, and supporting the alignment tool controller 110 processing and memory.

FIG. 2 System Function

Referring now to FIGS. 2A-D, diagrams of a system function in accordance with an embodiment of the inventive concepts disclosed herein are shown. The system function 200 of the system for ground calibration of the W×R 100 may include, represented within FIG. 2A, use of the reference aircraft 140 which has test flown and calibrated an onboard calibrated W×R. The system for ground calibration of the W×R 100 may then function to use the ground reference map 142 collected as the reference aircraft 140 is parked, FIG. 2B, in a specific ground position 212 and on a specific heading 214. In one embodiment of the inventive concepts disclosed herein, the specific ground position 212 may include a position marked on a surface runway 210. The specific ground position 212 may include a plurality of positions desirable to a manufacturer or operator.

On one exemplary embodiment, a specific ground position 212 may include a latitude longitude or any coordinate system. For example, one specific ground position 212 may include a latitude of N 47 30.0 and a longitude of W 122 13.0 on a specific heading 214 of 338.0 degrees magnetic.

While parked on specific position 212 and heading 214, the reference aircraft 140 W×R may generate the reference ground map 142 by actively operating the calibrated W×R to illuminate surrounding terrain within a field of view (FOV) of the calibrated W×R. The calibrated W×R may receive radar returns from the FOV terrain (natural and man-made) and create an accurate picture of a W×R view of a local ground picture.

In embodiments, the calibrated W×R may generate the reference ground map 142 over a minimum period in the specific ground position on the specific heading. For example, an exemplary seven to eight minute run time may be sufficient to generate the accurate ground reference map 142.

A typical W×R FOV may include a plus or minus 60 degrees from the nose of the aircraft for a complete picture of 120 degrees. Additional FOV of W×R may fall directly within the scope of the inventive concepts herein.

In one embodiment of the inventive concepts disclosed herein, the alignment tool controller 110 may receive the reference ground map 142 which has been generated by the calibrated W×R onboard the reference aircraft 140 with the reference aircraft 140 parked in the specific ground position 212 and on the specific heading 214.

In one embodiment of the inventive concepts disclosed herein, the reception of the reference ground map may further include an output of the calibrated W×R ground reference map 142 via a health monitor port on the calibrated W×R.

The alignment tool controller 110 may receive an UC ground map 152 produced by the UC W×R 120 via the communications port 126 during an active UC W×R 120 operation, FIG. 2C, with the UC aircraft 150 in the specific ground position 212 and on the specific heading 214.

In embodiments, the alignment tool controller 110 may receive the UC ground map produced by the UC W×R 120 for a minimum period of the active UC W×R 120 operation in the specific ground position 212 on the specific heading 214. For example, a reception time of an exemplary seven to eight minutes may be sufficient for the alignment tool controller 110 to determine correct offset values.

Here, if the UC W×R 120 were calibrated, the local ground picture produced by the UC W×R 120 and the ground reference map 142 may be the same. The alignment tool controller 110 may, FIG. 2D, compare 242 the UC ground map 152 to the reference ground map 142, determine 244 a delta between the UC ground map 152 and the reference ground map 142, and generate a pitch offset, a roll offset, and an elevation offset required reduce the delta to a desired operational value.

In reduce the delta to a desired operational value, the alignment tool controller 110 may determine what offsets are required in pitch roll and elevation to make the UC ground map 152 match the reference ground map 142. In one example, the desired operational value may fall within an exemplary approximately +/−0.25 deg of a calibrated value. In this manner, the system for ground calibration of the W×R 100 may align the UC W×R 120 to a standard operational tolerance for further operational use.

Once determined, the alignment tool controller 110 may calibrate the UC W×R 120 by applying the pitch offset, the roll offset and the elevation offset to the W×R memory 124 via the communications port 126. In one embodiment of the inventive concepts disclosed herein, the W×R memory 124 may include a non-volatile memory (NVM) with a lockable portion capable of receiving and storing the offset values without corruption or loss.

In embodiments, the alignment tool controller 110 may calibrate the UC W×R 120 by applying the pitch offset, the roll offset and the elevation offset to the W×R memory 124 via an initialization of a radar alignment servo within the UC W×R 120. In embodiments, the alignment tool controller 110 may log each of the offsets to a non-volatile portion of the memory 116 and load each of the offsets to the UC W×R upon a UC W×R power cycle.

In one embodiment of the inventive concepts disclosed herein, the W×R alignment tool 102 may function to compare an amplitude of the returns generated by the UC W×R 120 and determine the delta between those amplitudes generated by the UC W×R 120 to the amplitudes found in the reference ground map 142.

In one embodiment of the inventive concepts disclosed herein, the alignment tool 102 may be incorporated within a portable device capable of being carried from aircraft to aircraft and calibrate a plurality of UC W×R 120 on an associated plurality of UC aircraft 150 based on the comparison of each received UC ground map 152 with the ground reference map 142.

Figure 3:
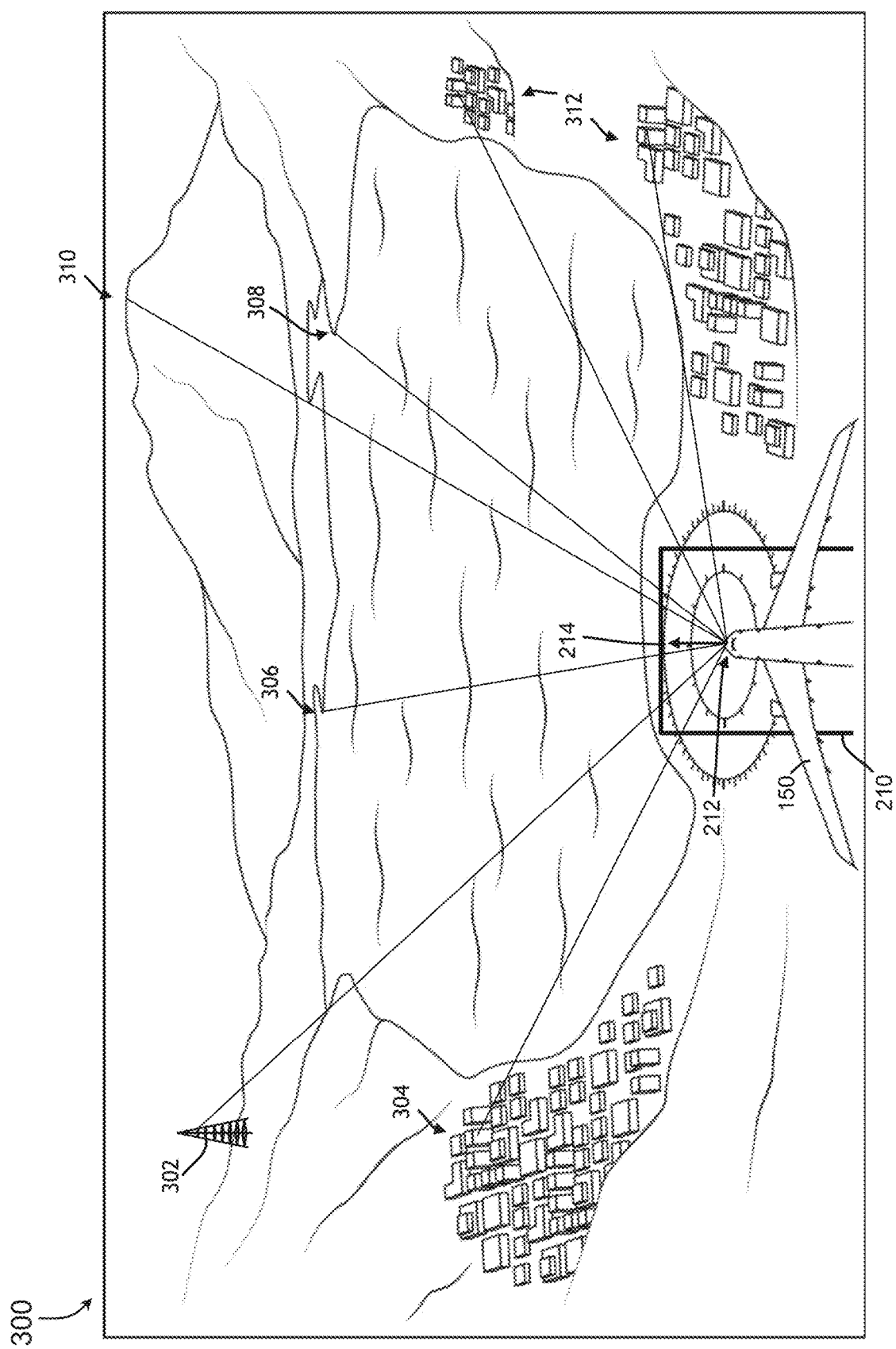
FIG. 3 is a diagram of a perspective view of a ground calibration exemplary of an embodiment of the inventive concepts disclosed herein.

FIG. 3 Specific Ground Position

Referring now to FIG. 3, a diagram of a perspective view of a ground calibration exemplary of an embodiment of the inventive concepts disclosed herein is shown. The perspective view 300 may indicate a FOV of the UC W×R 120 as the UC W×R 120 is operated and the UC ground map is received by the alignment tool controller 110. The calibrated W×R and the UC W×R 120 may each illuminate a left sector tower 302, a group of left sector buildings 304, a center sector terrain 306, a right sector terrain 308, a right sector mountain 310, and a group of right sector buildings 312. In producing the ground reference map 142, the calibrated W×R may illuminate each of these features and collect the returns from each feature to accurately create the ground picture.

Then, as the alignment tool controller 110 monitors the UC W×R 120 while it is illuminating the same features 302-312 from the same specific position 212 and heading 214, the alignment tool controller 110 may determine the delta between the two pictures and apply correct offset values in pitch, roll, and elevation to calibrate the UC W×R 120.

In embodiments, the specific ground position 212 combined with the specific heading 214 may offer the UC W×R 120 a FOV with a radar significant ground object within each of a left sector, a center sector, and a right sector of the UC W×R 120.

In one embodiment of the inventive concepts disclosed herein, the calibrated W×R may be unmodified while the alignment tool may perform the function of actively interrogating the calibrated W×R to retrieve the reference ground map 142 data from the calibrated W×R and storing the reference ground map 142 to the memory 106. In additional embodiments, the calibrated W×R may produce the ground reference map 142 and export the ground reference map 142 to the alignment tool controller 110 via a passive reception for storage within the memory 106.

In one embodiment of the inventive concepts disclosed herein, a test of the system for ground calibration of the W×R 100 may reveal an accurate determination of the offset values required to calibrate the UC W×R 120. Indicated in Table 1, a preset offset error in elevation was entered and the alignment tool controller 110 was allowed to determine offset correction values to correct the error.

TABLE 1

| Pre-Set Elev. Offset (deg) | Elev. Offset Correction (deg) |
|---|---|
| −0.8 | −0.76194 |
| −0.4 | −0.45579 |
| +0.4 | 0.48919 |
| +0.8 | 0.75949 |

To verify the alignment tool controller 110 may compute a correct offset value within tolerance for accurate UC W×R 120 operation, a calibrated offset may be compared with the computed offset values. For accurate W×R alignment and future W×R flight operation without an undesirable clutter leakage, a generally accepted tolerance may include a calculated combined offset from pitch and elevation may fall within an exemplary desired operational value of approximately +/−0.25 degrees of calibrated offset. Table 2 may indicate values generally acceptable within these tolerances.

TABLE 2

| Axis | Calibrated Offset (deg) | Computed Offset (deg) |
|---|---|---|
| Pitch | −0.516342 | −0.47555 |
| Roll | 0.10906 | 0.079782 |
| Elevation | 0.28125 | 0.24043 |

FIG. 4 Method

Figure 4:
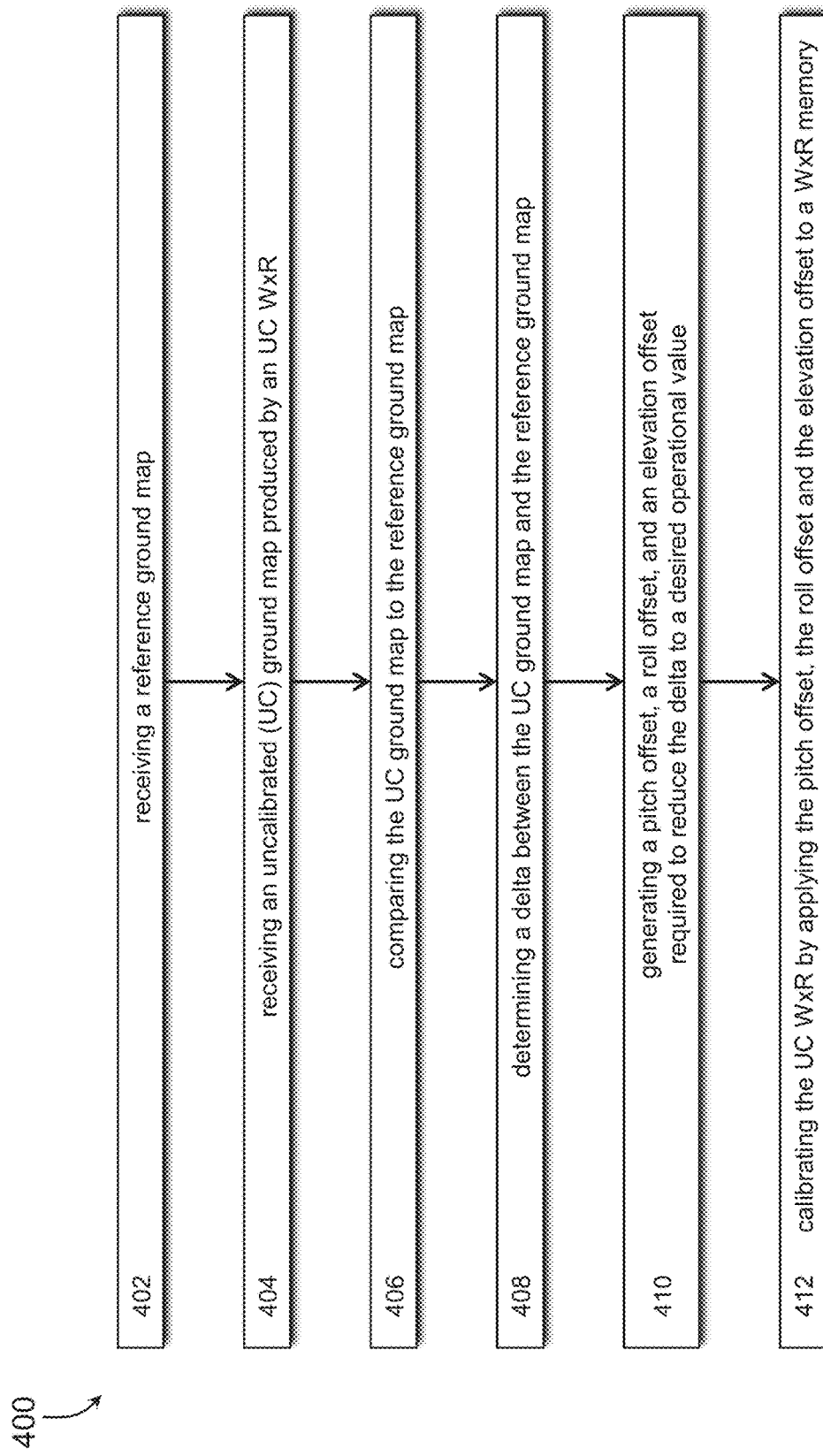
FIG. 4 is a diagram of a method flow exemplary of one embodiment of the inventive concepts disclosed herein.

Referring now to FIG. 4, a diagram of a method flow exemplary of one embodiment of the inventive concepts disclosed herein is shown. A method 400 for ground calibration of an aircraft weather radar may include, at a step 402, receiving a reference ground map, the reference ground map 1) generated by a test flown reference aircraft weather radar (W×R) 2) onboard a reference aircraft 3) with the calibrated aircraft in a specific ground position, and 4) on a specific heading.

A step 404 may include receiving an uncalibrated (UC) ground map produced by an UC W×R onboard an UC aircraft 1) during an active UC W×R operation, with the UC aircraft 2) in the specific ground position, and 3) on the specific heading. A step 406 may include comparing the UC ground map to the reference ground map and, at a step 408, determining a delta between the UC ground map and the reference ground map.

The method may include, at a step 410, generating a pitch offset, a roll offset, and an elevation offset required reduce the delta to a desired operational value and, at a step 412, calibrating the UC W×R by applying the pitch offset, the roll offset and the elevation offset to a W×R memory.

In one embodiment of the inventive concepts disclosed herein, receiving the reference ground map 142 may further include a reception of the reference ground map 142 from a calibrated W×R and actively interrogating the calibrated W×R to determine the reference ground map.

Also, receiving the reference ground map 142 may further include a wired reception directly from the calibrated W×R, and a reception of the ground reference map from a source other than the calibrated W×R. For example, the reference ground map may be stored on any storage device and loaded within a memory 106 of a plurality of alignment tools 102 to service a plurality of aircraft at the specific position 212.

CONCLUSION

As will be appreciated from the above description, embodiments of the inventive concepts disclosed herein may provide a novel solution to initializing a newly installed weather radar system without requiring a test flight.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for ground calibration of an aircraft weather radar, comprising:
   an uncalibrated (UC) aircraft weather radar (W×R) onboard an UC aircraft;
   the UC W×R including a W×R controller and a W×R memory;
   the W×R controller operatively coupled to a communications port;

a W×R alignment tool including an alignment tool controller;

the W×R alignment tool including a tangible, non-transitory memory configured to communicate with the alignment tool controller, the tangible, non-transitory memory having instructions stored therein that, in response to execution by the alignment tool controller, cause the alignment tool controller to:

receive a reference ground map, the reference ground map 1) generated by a test flown calibrated W×R 2) onboard a reference aircraft 3) with the reference aircraft in a specific ground position, and 4) on a specific heading;

receive an UC ground map produced by the UC W×R via the communications port 1) during an active UC W×R operation, with the UC aircraft 2) in the specific ground position, and 3) on the specific heading;

compare the UC ground map to the reference ground map;

determine a delta between the UC ground map and the reference ground map;

generate a pitch offset, a roll offset, and an elevation offset required to reduce the delta to a desired operational value; and calibrate the UC W×R by applying the pitch offset, the roll offset and the elevation offset to the W×R memory via the communications port.

2. The system for ground calibration of an aircraft weather radar of claim 1, wherein the UC W×R further comprises a new W×R in a new UC aircraft, a suspect W×R in a reference aircraft, a W×R on which a maintenance function has been performed, and the UC W×R in an UC aircraft of a plurality of aircraft types.

3. The system for ground calibration of an aircraft weather radar of claim 1, wherein calibrate the UC W×R further comprises logging each of the offsets to a non-volatile portion of the memory and loading each of the offsets to the UC W×R upon a UC W×R power cycle.

4. The system for ground calibration of an aircraft weather radar of claim 1, wherein the W×R alignment tool is further incorporated within one of: a portable W×R health monitor tool and a stand-alone portable device configured for communicating with each of the calibrated W×R and the UC W×R, and supporting the alignment tool controller processing and memory.

5. The system for ground calibration of an aircraft weather radar of claim 1, wherein the specific ground position combined with the specific heading offers the UC W×R a field of view with a radar significant ground object within a plus or minus 60 degrees of the specific heading.

6. The system for ground calibration of an aircraft weather radar of claim 1, wherein receive the reference ground map further comprises an output of the calibrated W×R ground reference map via a health monitor port.

7. The system for ground calibration of an aircraft weather radar of claim 1, wherein the reference ground map is generated by the calibrated W×R over a minimum period in the specific ground position on the specific heading.

8. The system for ground calibration of an aircraft weather radar of claim 1, wherein receive the UC ground map produced by the UC W×R further comprises a minimum period of the active UC W×R operation in the specific ground position on the specific heading.

9. The system for ground calibration of an aircraft weather radar of claim 1, wherein the communications port further comprises one of: an ethernet port, or an additional wired port.

10. The system for ground calibration of an aircraft weather radar of claim 1, wherein calibrate the UC W×R by applying the pitch offset, the roll offset and the elevation offset to the W×R memory further comprises an initialization of a radar alignment servo within the UC W×R.

11. A method for ground calibration of an aircraft weather radar, comprising:

receiving a reference ground map, the reference ground map 1) generated by a test flown reference aircraft weather radar (W×R) 2) onboard a reference aircraft 3) with the reference aircraft in a specific ground position, and 4) on a specific heading;

receiving an uncalibrated (UC) ground map produced by an UC W×R onboard an UC aircraft 1) during an active UC W×R operation, with the UC aircraft 2) in the specific ground position, and 3) on the specific heading;

comparing the UC ground map to the reference ground map;

determining a delta between the UC ground map and the reference ground map;

generating a pitch offset, a roll offset, and an elevation offset required to reduce the delta to a desired value; and calibrating the UC W×R by applying the pitch offset, the roll offset and the elevation offset to a W×R memory.

12. The method for ground calibration of an aircraft weather radar of claim 11, wherein receiving the reference ground map further comprises one of a passive reception of the reference ground map from a calibrated W×R and actively interrogating the calibrated W×R to determine the reference ground map.

13. The method for ground calibration of an aircraft weather radar of claim 11, wherein receiving the reference ground map further comprises a wired reception directly from the calibrated W×R, and a reception of the ground reference map from a source other than the calibrated W×R.

14. The method for ground calibration of an aircraft weather radar of claim 11, wherein comparing the ground map produced by the active UC W×R operation to the reference ground map further comprises comparing an amplitude of at least one return received during the receiving the UC ground map to at least one amplitude of the reference ground map.

15. The method for ground calibration of an aircraft weather radar of claim 11, wherein receiving the UC ground map produced by the UC W×R further comprises a minimum period of the active UC W×R operation in the specific ground position on the specific heading.

* * * * *